3,020,166
PROCESS FOR THE MANUFACTURE OF DYED STRUCTURES FROM REGENERATED CUPRAMMONIUM CELLULOSE
Jacques Wegmann and Carl Becker, Basel, Switzerland, assignors to Ciba Company, Inc., Fair Lawn, N.J.
No Drawing. Filed Aug. 22, 1958, Ser. No. 756,513
Claims priority, application Switzerland Aug. 28, 1957
7 Claims. (Cl. 106—167)

It is known that for the manufacture of dyed structures, especially fibers and foils from regenerated cellulose, dispersed pigments can be added to the cuprammonium cellulose spinning solution. A particular difficulty in the use of pigments consists, however, in that the latter must be extremely finely divided in the cellulose solution in order to ensure undisturbed spinning and even dyeing of the filament. If the degree of dispersion in the spinning solution is not fine enough, part of the pigment may remain behind on filtering the solution. In addition, it is often difficult in the pigment dyeing process to obtain transparent dyeings, especially when using high dyestuffs concentrations. This process can therefore not be used for the dyeing of foils where transparence is required. In contrast to the corresponding viscose spin-dyeings, the spin-dyeings of cuprammonium rayon obtained with dispersed pigments are in general not fast to crocking and, also in contrast to viscose, it is very difficult to obtain with pigments spin-dyeings of cuprammonium rayon which do not bleed. Attempts have been made to overcome the above difficulties by dyeing the spinning solution with water-soluble dyestuffs; but in the subsequent precipitation, decoppering and washing processes the greater part of the dyestuff was washed out again.

It has now been found that wash-fast dyed structures from regenerated cellulose are obtained, which are transparent even when high concentrations of dyestuff are used, by adding to the cellulosic cuprammonium spinning solution organic, water-soluble dyestuffs which contain a reactive group and which can form a chemical bond wtih the free hydroxyl groups of the cellulose molecule dissolved in the ammoniacal copper oxide solution, and forming the so-treated spinning solution.

As organic dyestuffs which can be used in the present process, dyestuffs of the most different classes are concerned, e.g. stilbene dyestuffs, azine dyestuffs, dioxazine dyestuffs, perinone dyestuffs, peri-dicarboxylic acid imide dyestuffs, nitro dyestuffs, triphenyl-methane dyestuffs, anthraquinone dyestuffs, but more especially phthalocyanine dyestuffs and the acid azo dyestuffs including metal-free and metallizable and metalliferous mono- and polyazo dyestuffs which contain a group or a substituent which can react with polyhydroxylated materials. Among these there may be mentioned, for example, the vinyl grouping in a vinyl sulfone group or in the acrylic acid radical, the ethylene imine grouping, an epoxy group and particularly such labile substituents as can be easily split off taking the electron pair of the bond with them.

As labile substituents which can be split off taking the electron pair of the bond with them there may be mentioned, for example, aliphatically bound phosphorous or sulfuric acid ester groups and particularly aliphatically bound sulfonyloxy groups and aliphatically or heterocyclically bound halogen atoms, e.g. an aliphatically bound chlorine atom. It is of advantage when these labile substituents are in γ- or β-position of an aliphatic radical which is bound to the dyestuff molecule directly or through an amino, sulfone or sulfonic acid amide group; in the dyestuffs which come into consideration which have halogen atoms as labile substituents, these exchangeable halogen atoms can be in an aliphatic acyl radical (e.g. in β-position of a propionyl radical) or with advantage in a heterocyclic ring, in the latter case primarily dyestuffs having a dichlorotriazine radical being concerned. There may be mentioned, for instance, dyestuffs which contain a halogen-1,3,5-triazine radical, particularly a 2,4-dichloro-1,3,5-triazine radical which is bound in 6-position. Especially good results are also obtained with soluble dyestuffs which contain a chlorhydrin grouping bound through a nitrogen atom, especially through an —NH— group to an aliphatic chain.

A great number of the dyestuffs of the above type are known or can be made by methods known per se, e.g. from dyestuff components which already contain the aforementioned labile substituents, or by incorporating by methods known per se radicals containing such labile substituents in the dyestuffs molecule after the dyestuff has been prepared. Valuable condensation products which contain another exchangeable chlorine atom and which are suitable for the dyeing process of the present invention are obtained by reacting phthalocyanine, azo or anthraquinone dyestuffs which contain a reactive —OH—, —SH— or particularly —NH$_2$— group, e.g. with chloracetyl chloride, with β-chloro-propionyl chloride or chloropropionic anhydride, with cyanuric chloride or with primary condensation products from cyanuric chloride containing two chlorine atoms and an organic radical instead of the third chlorine atom of the cyanuric chloride. The group of the dyestuffs to be used in the present process which have a sulfonylated hydroxyl group can be so prepared, for example, by reacting 1 mol of a dyestuff which contains a hydroxyalkyl group, e.g. a sulfonic acid-N-hydroxylalkyl amide group or a β-hydroxyalkyl-sulfone group with at least one mol of an organic sulfonic acid halide, e.g. paratoluene sulfonic acid chloride, benzene-sulfonyl chloride, in such a manner that the hydroxyl group is acylated.

The above dyestuffs can be added to the cellulose-cuprammonium solution in dissolved, dispersed or in solid form, if desired together with a wetting or dispersing agent. In order that the reaction of the reactive groups wih the cellulose molecules may be as complete as possible, the solution can be allowed to stand at room temperature for a longer time, for example, for about 20 to 60 hours, or the solution may be heated. In many cases it is of advantage to prepare with the dyestuffs a concentrated stock solution or dispersion which may contain up to 30% of dyestuff calculated on the cellulose content of the ammoniacal copper oxide solution and to add this stock solution to the spinning solution to be dyed.

The structures are formed after homogenization and de-aeration by extruding the dyed cellulose-cuprammonium solution into a coagulating bath or precipitating bath by the usual method and using the ordinary spinning and reeling machine or continuous spinning machine.

The after-treatment of the resulting structures is carried out by ordinary methods by decoppering and washing followed by rinsing and scrooping.

The dyed fibers, filaments and foils obtained show great brilliance, transparence and excellent fastness to washing and crocking.

The following examples illustrate the invention, the parts and percentages being by weight unless otherwise stated:

*Example 1*

3 parts of the dyestuff of the formula

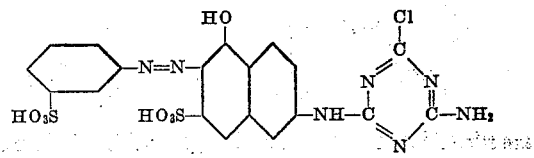

are dispersed by grinding into 30 parts of a 10% solution of the reaction product of 8 molecules of ethylene oxide and 1 molecule of para-tertiary octylphenol.

The dispersion is stirred into 1000 parts of a solution of cellulose in ammoniacal copper oxide which contains 7% cellulose, 6% ammonia and 3% copper.

After allowing the solution to stand for 48 hours at room temperature it is extruded to form a film which is then coagulated in a sulfuric acid solution of 10% strength.

The film is washed thoroughly with water, neutralized and treated for half an hour at boiling temperature in a solution which contains 1 gram per litre of an ion-free washing agent and 2 grams per litre of sodium carbonate, rinsed and dried.

An orange-colored film which is fast to light and water is obtained.

A similarly good result is obtained when instead of 10% sulfuric acid a 8% solution of sodium hydroxide is used for the coagulation, and, after rinsing, the film is treated for a short time in a 0.5% sulfuric acid solution.

Similarly good results are obtained with the following dyestuffs:

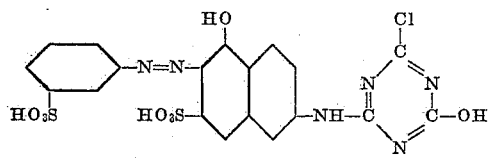

Tint: orange

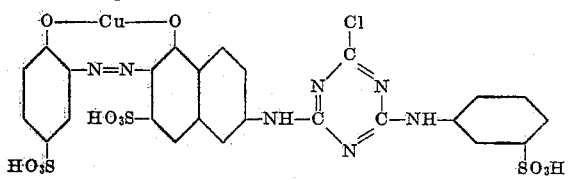

Tint: ruby

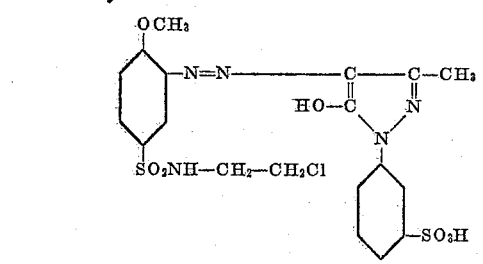

Tint: yellow

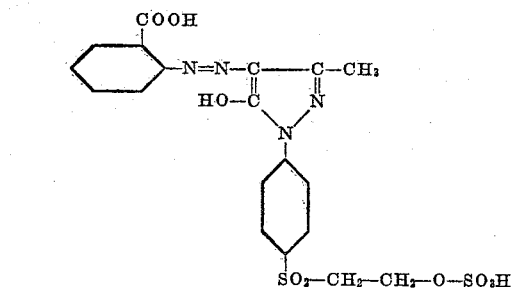

Tint: yellow

*Example 2*

3 parts of the dyestuff of the formula

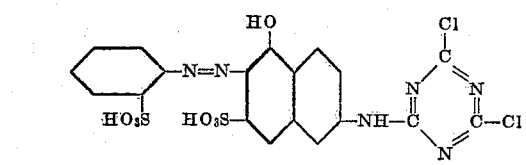

are stirred into an ammoniacal copper oxide cellulose solution as described in Example 1, a film is then prepared and worked up as described in Example 1.

A strong orange colored, transparent film of good fastness to light and water is obtained.

If 3 parts of the dyestuff of the formula

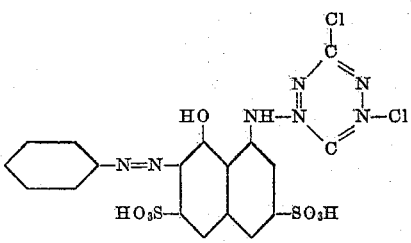

are used, a red film having similarly good properties is obtained.

*Example 3*

2 parts of the dyestuff of the formula

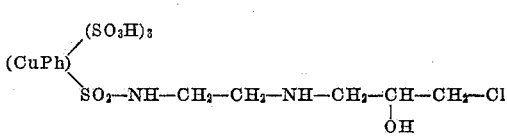

(CuPh=copper phthalocyanine) are dissolved in 20 parts of water and added to 1000 parts of a 9% solution of cellulose in an ammoniacal copper oxide solution which contains 3.5% of copper and 7.5% of ammonia in addition to a slight quantity of sodium hydroxide. The mixture is homogenized in a kneading machine for 3 hours and then de-aerated in an autoclave for 20 hours. The mass is then precipitated in an aqueous solution through nozzles in a countercurrent, the filaments being stretched at the same time.

The filaments are treated in a 5% sulfuric acid solution, rinsed, and the resulting yarn is soaped for 15 minutes in a 0.1% solution of hot soap, rinsed and dried. A turquoise blue colored rayon yarn which is fast to washing and light is obtained.

If, instead of the above dyestuff, corresponding parts of the dyestuffs of the formulae given below are used and the procedure is the same as described above, similarly good transparent dyeings are obtained.

(1)

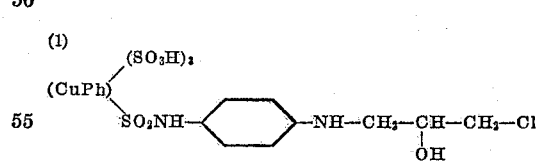

Tint: greenish blue (2)

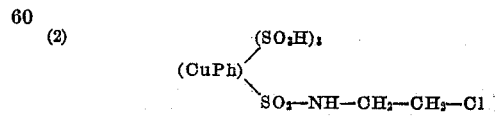

Tint: greenish blue (3)

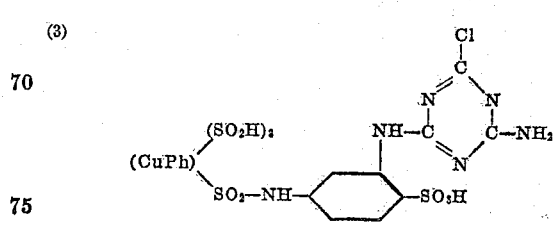

Tint: greenish blue (4) 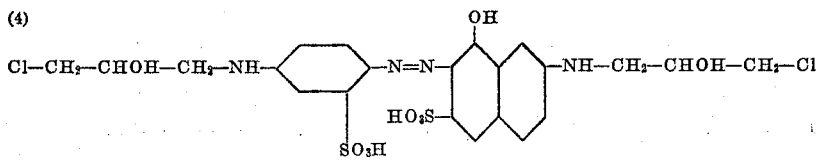

Tint: currant (5) 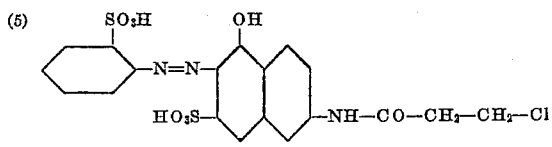

Tint: orange (6) 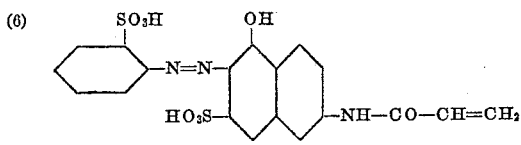

Tint: orange (7) 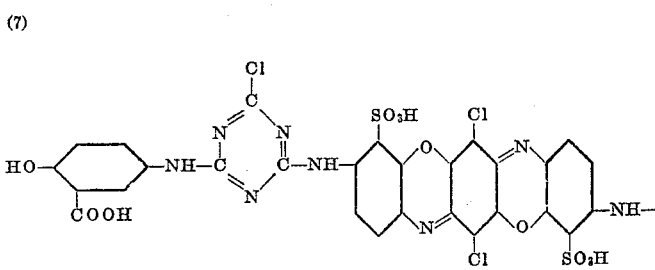

Tint: blue (8) 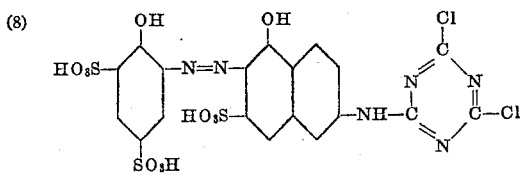

1:1 copper complex:blue-red
1:2 copper complex:brown-red
1:2 chromium complex:violet (9) 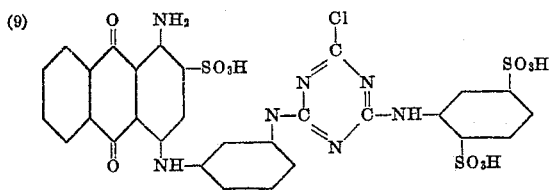

Tint: blue

The above dyestuff No. 4 can be prepared by coupling diazotized 5-acetylamino-2-amino-benzene-1-sulfonic acid with 2-amino-8-hydroxy-naphthalene-3-sulfonic acid, saponifying the acetylamino group in the resulting monoazo dyestuff and condensing with epichlorhydrin in an alkaline medium.

What is claimed is:

1. A process for the manufacture of fibers and foils from regenerated cellulose, consisting in adding to an ammoniacal copper oxide spinning solution a water-soluble organic dyestuff selected from the group consisting of phthalocyanine, azo, anthraquinone and oxazine dyestuffs containing at least one reactive substituent capable of forming a chemical bond with the hydroxyl groups of the cellulose molecule due to the presence of a member selected from the group consisting of a sulfonyl-oxy group and a chlorine atom, and spinning the so-treated spinning solution into filaments and foils.

2. A process according to claim 1, wherein a phthalocyanine dyestuff containing sulfonic acid groups and a sulfonic acid amide group having a reactive substituent capable of forming a chemical bond with the hydroxyl groups of the cellulose molecule due to the presence of a chlorine atom is added to the spinning solution prior to spinning.

3. A process according to claim 1, wherein prior to spinning, a monoazo dyestuff containing a sulfonic acid group and a chloro-1,3,5-triazine radical is added to the ammoniacal copper oxide cellulose solution.

4. In a process for producing colored filaments of regenerated cellulose, the improvement which consists in incorporating a water-soluble organic dyestuff selected from the group consisting of phthalocyanine, azo, anthraquinone and oxazine dyestuffs containing a reactive substituent capable of forming a chemical bond with the hydroxyl groups of the cellulose molecule into a cellulose cuprammonium solution, prior to spinning.

5. A process for producing colored filaments of regenerated cellulose, wherein an organic water-soluble dyestuff selected from the group consisting of phthalocyanine, azo, anthraquinone and oxazine dyestuffs and containing a sulfonic acid group and a reactive substituent capable of forming a chemical bond with the hydroxyl groups of the cellulose molecule due to the presence of a chlorine atom, is incorporated into an ammoniacal copper oxide cellulose solution containing 7 to 9 percent of cellulose, 6 to 8 percent of ammonia and 3 to 3.5 percent of copper, and the resulting colored solution is spun into fibers.

6. A process according to claim 5, wherein the dyestuff contains as reactive substituent capable of forming a chemical bond with the hydroxyl groups of the cellulose molecule a member selected from the group consisting of a chloro-1,3,5-triazine radical, a chlorinated aliphatic acyl group of three carbon atoms, a chloro-ethyl sulfone and a chloro-ethyl sulfonamide radical.

7. A process according to claim 1, wherein the organic dyestuff selected from the group consisting of phthalocyanine, azo, anthraquinone and oxazine dyestuffs contains as reactive substituent capable of forming a chemical bond with the hydroxyl groups of the cellulose molecule an hydroxy-ethyl group, of which the hydroxyl group is esterified by sulfuric acid.

(References on following page)

References Cited in the file of this patent

UNITED STATES PATENTS

| | | |
|---|---|---|
| 1,886,480 | Haller et al. | Nov. 8, 1932 |
| 2,132,491 | Mudford | Oct. 11, 1938 |
| 2,145,580 | Bley | Jan. 31, 1939 |
| 2,300,572 | Hoyer et al. | Nov. 3, 1942 |
| 2,843,580 | Straley et al. | July 15, 1958 |
| 2,848,461 | Pizzarello et al. | Aug. 19, 1958 |
| 2,927,035 | Wegman et al. | Mar. 1, 1960 |

OTHER REFERENCES

Speel: "Textile Chemicals and Auxiliaries," 2nd ed. 1957, New York, pp. 80–82, 441 and 442.

"Kolorbon, Heavy Denier Solution-Dyed Rayon," by Hartford Rayon Co., Rocky Hill, Conn., 1958.

UNITED STATES PATENT OFFICE
CERTIFICATE OF CORRECTION

Patent No. 3,020,166            February 6, 1962

Jacques Wegmann et al.

It is hereby certified that error appears in the above numbered patent requiring correction and that the said Letters Patent should read as corrected below.

Column 1, line 42, for "wtih" read -- with --; column 2, line 41, for "wih" read -- with --; column 4, lines 7 to 16, the upper right-hand portion of the formula should appear as shown below instead of as in the patent:

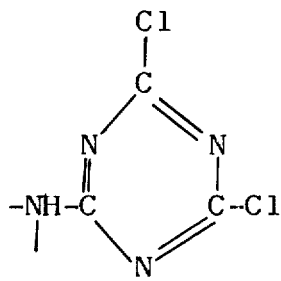

same column 4, lines 67 to 75, the upper right-hand portion of the formula should appear as shown below instead of as in the patent:

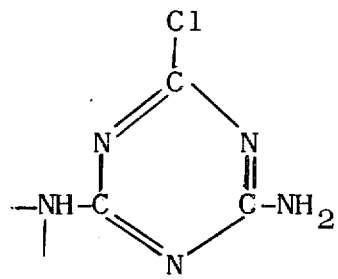

column 5, lines 55 to 62, for the portion of formula (9) reading

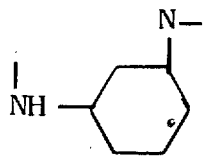          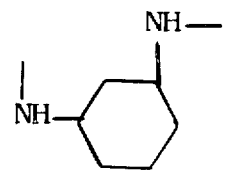

Signed and sealed this 25th day of September 1962.

(SEAL)
Attest:
ERNEST W. SWIDER            DAVID L. LADD
Attesting Officer            Commissioner of Patents